US009756174B2

(12) United States Patent
Kohler et al.

(10) Patent No.: US 9,756,174 B2
(45) Date of Patent: Sep. 5, 2017

(54) METHOD OF OPERATING A MOTOR VEHICLE, AND MOTOR VEHICLE

(71) Applicant: Audi AG, Ingolstadt (DE)

(72) Inventors: Linda Kohler, Ingolstadt (DE); Barbara Boos, Garmisch-Partenkirchen (DE)

(73) Assignee: Audi AG, Ingolstadt (DE)

(*) Notice: Subject to any disclaimer, the term of this patent is extended or adjusted under 35 U.S.C. 154(b) by 0 days.

(21) Appl. No.: 15/123,839

(22) PCT Filed: Sep. 5, 2015

(86) PCT No.: PCT/EP2015/001791
§ 371 (c)(1),
(2) Date: Sep. 6, 2016

(87) PCT Pub. No.: WO2016/055135
PCT Pub. Date: Apr. 14, 2016

(65) Prior Publication Data
US 2017/0019524 A1  Jan. 19, 2017

(30) Foreign Application Priority Data
Oct. 7, 2014 (DE) .................. 10 2014 014 601

(51) Int. Cl.
*H04M 1/725* (2006.01)
*H04M 1/60* (2006.01)
(Continued)

(52) U.S. Cl.
CPC ..... *H04M 1/72577* (2013.01); *H04M 1/6075* (2013.01); *H04M 1/7253* (2013.01);
(Continued)

(58) Field of Classification Search
CPC ........... H04M 1/6075; H04M 1/72577; H04M 1/7253; H04M 1/72569; H04W 4/046;
(Continued)

(56) References Cited

U.S. PATENT DOCUMENTS 7,584,050 B2 * 9/2009 Naito ................. G01C 21/3655
340/995.27
7,925,435 B2 * 4/2011 Brulle-Drews .... G01C 21/3423
340/995.1
(Continued)

FOREIGN PATENT DOCUMENTS

DE 19821163 A1 11/1999
DE 19934105 A1 1/2001
(Continued)

OTHER PUBLICATIONS

International Search Report and Written Opinion directed to related International Patent Application No. PCT/EP2015/001791, mailed Nov. 9, 2015, with attached English-language translation; 24 pages.
(Continued)

*Primary Examiner* — Mehmood B Khan
(74) *Attorney, Agent, or Firm* — Sterne, Kessler, Goldstein & Fox P.L.L.C.

(57) ABSTRACT

The invention relates to a method for operating a motor vehicle which has a communications device, a navigation system, and an analysis unit, the method comprising the steps of: specifying, by means of the analysis unit, at least one position at which a demanding driving situation for the driver of the motor vehicle is expected; ascertaining, by means of the analysis unit, the distance of the motor vehicle from the specified position; assessing, by means of the analysis unit, whether the ascertained distance is shorter than a first predetermined distance if the motor vehicle is approaching the specified position and/or whether the ascertained distance is shorter than a second predetermined
(Continued)

distance if the motor vehicle is moving away from the specified position; and preventing, by means of the communication device, communication via the communication device if the ascertained distance is shorter than either the first or the second distance.

20 Claims, 1 Drawing Sheet

(51) Int. Cl.
*H04W 4/02* (2009.01)
*H04W 4/04* (2009.01)
*G08G 1/0967* (2006.01)
*G08G 1/16* (2006.01)

(52) U.S. Cl.
CPC ....... *H04M 1/72569* (2013.01); *H04W 4/023* (2013.01); *H04W 4/046* (2013.01); *G08G 1/096775* (2013.01); *G08G 1/161* (2013.01)

(58) Field of Classification Search
CPC .. H04W 4/023; G08G 1/096775; G08G 1/161
See application file for complete search history.

(56) References Cited

U.S. PATENT DOCUMENTS

| | | | | |
|---|---|---|---|---|
| 8,483,950 | B2* | 7/2013 | Okude | G01C 21/3476 701/411 |
| 2001/0032236 | A1* | 10/2001 | Lin | G01C 21/26 709/203 |
| 2002/0016667 | A1 | 2/2002 | Baur et al. | |
| 2003/0028320 | A1* | 2/2003 | Niitsuma | G01C 21/3415 701/411 |
| 2003/0096593 | A1* | 5/2003 | Naboulsi | B60R 11/02 455/411 |
| 2003/0134660 | A1* | 7/2003 | Himmel | H04B 1/3822 455/557 |
| 2005/0085998 | A1* | 4/2005 | Bless | G08G 1/0962 701/533 |
| 2005/0143905 | A1* | 6/2005 | Yoshikawa | G01C 21/3617 701/424 |
| 2008/0091339 | A1* | 4/2008 | Nagase | G01C 21/32 701/532 |
| 2009/0079555 | A1* | 3/2009 | Aguirre De Carcer | G07C 5/008 340/441 |
| 2010/0057344 | A1* | 3/2010 | Nezu | G01C 21/367 701/533 |
| 2011/0117903 | A1* | 5/2011 | Bradley | H04M 1/6075 455/418 |
| 2012/0086395 | A1* | 4/2012 | Kim | B60L 11/1838 320/109 |
| 2012/0231773 | A1* | 9/2012 | Lipovski | H04M 1/72552 455/414.1 |
| 2012/0250517 | A1* | 10/2012 | Saarimaki | H04W 4/001 370/241 |
| 2014/0303807 | A1* | 10/2014 | Addepalli | H04W 4/046 701/1 |
| 2014/0335902 | A1* | 11/2014 | Guba | H04W 4/027 455/456.4 |
| 2015/0296371 | A1* | 10/2015 | Kong | H04W 8/18 455/419 |
| 2016/0277911 | A1* | 9/2016 | Kang | H04W 4/22 |
| 2017/0055125 | A1* | 2/2017 | Chiou | H04W 4/022 |
| 2017/0138748 | A1* | 5/2017 | Mural | G01C 21/3415 |

FOREIGN PATENT DOCUMENTS

| | | |
|---|---|---|
| DE | 10226425 A1 | 12/2003 |
| DE | 102010038454 A1 | 2/2012 |
| DE | 102010056177 A1 | 6/2012 |
| EP | 1162586 A1 | 12/2001 |

OTHER PUBLICATIONS

International Preliminary Report on Patentability directed to related International Patent Application No. PCT/EP2015/001791, mailed Mar. 24, 2016, with attached English-language translation; 14 pages.

English-language abstract of German Patent Application Publication No. 19821163 A1, published Nov. 18, 1999; 2 pages.

English-language abstract of German Patent Application Publication No. 19934105 A1, published Jan. 25, 2001; 1 page.

English-language abstract of International Patent Application Publication No. WO03106222 A1, counterpart German Patent Application Publication No. 10226425 A1, published Dec. 24, 2003; 1 page.

English-language abstract of German Patent Application Publication No. 102010038454 A1, published Feb. 2, 2012; 2 pages.

English-language abstract or German Patent Application Publication No. 102010056177 A1, published Jun. 28, 2012; 2 pages.

\* cited by examiner

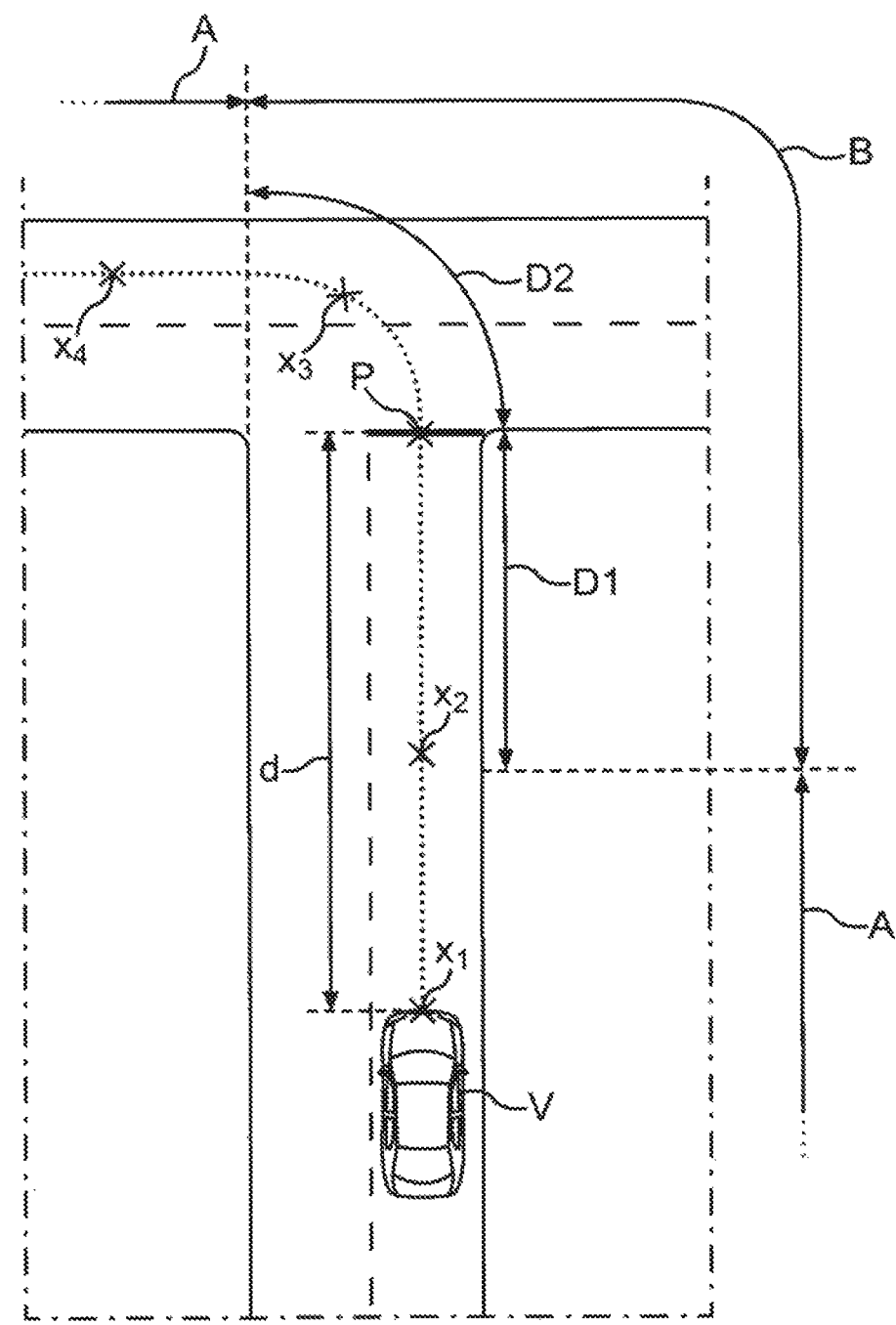

METHOD OF OPERATING A MOTOR VEHICLE, AND MOTOR VEHICLE

TECHNICAL FIELD

The invention relates to a method for operating a motor vehicle which has a communication device, a navigation system coupled to the communication device, and an analysis unit. The invention further relates to a motor vehicle which has a communication device, a navigation system coupled to the communication device, and an analysis unit.

BACKGROUND

In today's motor vehicles, mobile communication is possible via a communication device installed in the motor vehicle. Said communication device may be a car telephone or, for example, a hands-free system, to which a mobile phone, for example, is coupled. The driver is then able to access the communication device and/or the coupled mobile phone at any time, and the driver can be contacted at any time via the mobile phone and/or the communication device. If a call or a message is received during driving, it is forwarded immediately to the driver via the communication device. The driver is notified of this acoustically, for example, in the form of a ring tone and/or visually as a message in a display of the motor vehicle.

DE 199 34 105 A1 discloses an operable device, for example a car telephone or a radio, the functioning of which is restricted in hazardous driving situations by a decision unit. The hazardous driving situations here include particular situations in which the motor vehicle is moving faster than a predefined speed. Different speed limits may be provided for blocking incoming and outgoing calls.

DE 102 26 425 A1 discloses a method for assisting a driver of a motor vehicle in receiving calls. In said method, in the event of an incoming call, it is established whether the driver is able to accept the call based on the current demands being placed on the driver and/or on the driving situation. If this is not the case, it is established whether the acceptance of calls can ensue within a predetermined period of time. If so, a corresponding notification is conveyed or the call is placed on hold. Otherwise, the call is switched through to a memory or an answering machine.

DE 10 2010 056 177 A1 discloses a method for operating a motor vehicle which has a communication device, in which the availability of the communication device is controlled on the basis of at least one criterion, in which the driver is informed of the fulfillment of the at least one criterion by means of an interface unit if the communication device is not available.

BRIEF DESCRIPTION OF THE DRAWINGS/FIGURES

FIG. 1 illustrates an embodiment of a method through a schematic representation of a specified position at which a demanding driving situation for the driver of a motor vehicle is expected.

DETAILED DESCRIPTION

The object is therefore to improve the safety of operating a motor vehicle that is equipped with a communication device.

This object is achieved by the subjects of the independent claims. Advantageous embodiments are described in the dependent claims, the FIGURE and the description of the FIGURE.

The invention relates to a method for operating a motor vehicle which has a communication device, a navigation system coupled to the communication device, and an analysis unit. The analysis unit may in part or in its entirety be part of the communication device and/or the navigation system. Functions of the analysis unit can therefore be performed by either the communication device or the navigation system. The method comprises a series of steps designed to increase safety in operating the motor vehicle. A first step involves defining a driving situation that is demanding for the driver of a motor vehicle, and particularly a plurality of such driving situations, based on a position of the motor vehicle. A driving situation that is demanding for the driver in this case is understood particularly as a driving situation that places a particular level of demand on the driver, that is to say, a level of demand that goes beyond the average level of demand. This driving situation may involve, for example, turning and/or stopping, for example at an intersection, and/or a lane change, for example, at a turnoff point. A further step involves specifying, by means of the analysis unit, at least one position at which a demanding driving situation for the driver of the motor vehicle can be expected. For example, positions of intersections may be selected and specified in the navigation system. A next step involves ascertaining, by means of the analysis unit, the distance of the motor vehicle from the specified position, and ascertaining whether the motor vehicle is approaching and/or moving away from the specified position. This is followed by an assessment as to whether the ascertained distance is shorter than a first predetermined distance if the motor vehicle is approaching the specified position and/or whether the ascertained distance is shorter than a second predetermined distance if the motor vehicle is moving away from the specified position. This assessment is carried out by the analysis unit. Finally, communication via the communication device is prevented by the communication device if the distance is shorter than either the first or the second distance. The first and second distances are each particularly greater than zero. Communication may also be partially prevented, thus permitting a partial functionality of the communication device. This has the advantage of preventing any distraction of the driver in advance of a demanding driving situation. This allows the driver to direct his full attention to the demanding driving situation, resulting in increased safety in operating the motor vehicle. The prevention of communication even during movement away from the position where a demanding driving situation is expected increases safety since it has been found that the attention and reaction speed of a driver does not return immediately to its original or customary level following a demanding driving situation.

In an advantageous embodiment, the method relates to a communication device, which is coupled via a data transmission interface to a mobile phone, which in particular is not permanently installed in the motor vehicle, and which particularly comprises a hands-free device. This offers the advantage of increasing safety even when personal mobile phones are used, that is to say mobile phones that are not associated with a motor vehicle, such as those commonly used.

In a preferred embodiment, communication comprises at least one of the following activities: placing or receiving a telephone call and/or receiving an e-mail and/or sending an e-mail and/or receiving some other message and/or sending some other message. The prevention of communication in the case of a telephone call can involve preventing the placement of a telephone call, or in the case of an existing telephone connection, placing said connection on hold or terminating said connection, for example, and forwarding a notice to this effect to the calling parties. Receipt of an e-mail or some other message can be prevented by preventing display of receipt during the period of prevention, for example, but only after the prevention period has ended. Sending of an e-mail or some other message, which in this case also includes composing an e-mail or some other message, can be prevented by preventing writing or editing of the e-mail or other message. This offers the advantage of avoiding the proven negative effects of phone calls and of receiving and sending or reading and writing messages while driving in demanding driving situations, thereby increasing safety substantially.

In an advantageous embodiment, the driving situation that is defined as demanding for the driver comprises a driving situation in which, in order to maintain the accident-free operation of the motor vehicle by the driver, increased attention is required as compared with the average attention required to operate the motor vehicle. This has the advantage of focusing the attention of the driver, which is inherently limited in principle, and avoiding excess demands on the driver, for example from communication, during the demanding driving situation that requires extra attention. This also contributes to increasing safety in operating the motor vehicle.

In a preferred embodiment, the at least one predetermined position is a position that may be marked by a hazard sign in accordance with traffic regulations, in particular an intersection, more particularly a stop line of an intersection, and/or a merging roadway, in particular a stop line of a merging roadway, and/or a turn-off point, in particular the beginning of a turn-off point, and/or a construction zone, in particular the beginning of a construction zone, and/or the location of at least one static obstacle and/or at least one static hazardous zone, more particularly the location of an object in the roadway and/or the location of an accident, and/or the beginning of an area of traffic congestion and/or the location of a change in weather. Alternatively or in addition to the position that may be marked by a hazard sign in accordance with traffic regulations, the predefined position may be a dynamic position that characterizes a driving situation which is demanding on the driver. This driving situation may be a passing maneuver, for example, and the dynamic position may be predefined, for example, as the position of a preceding motor vehicle. In defining these positions, reports on traffic provided by another motor vehicle and/or an infrastructure may also be factored in. This offers the advantage of enabling the analysis unit to make a very simple selection from the specified positions. The types that are listed are known to represent positions in which a demanding driving situation for the driver of the motor vehicle can be expected. Selecting these positions thus offers the advantage of increasing safety in a particularly simple manner.

In an advantageous embodiment, it is provided that the at least one specified position is specified, particularly exclusively, on the basis of a map which is stored in the navigation system. This has the advantage that no additional vehicle data are required in order to increase safety. In addition, safety may be also increased without the vehicle communicating with an external communication source, for example with other motor vehicles or with an infrastructure or an Internet server.

In another preferred embodiment, it is provided that the first distance within which communication is prevented as the motor vehicle is approaching the specified position is greater than the second distance within which communication is prevented as the motor vehicle is moving away from the specified position. The second distance is particularly between 5% and 15% of the first distance. This has the advantage of factoring in the level of demand placed on the driver before and after the specified position, and of combining maximum safety with the fastest possible restoration of the ability to communicate.

In a further embodiment, it is provided that the two distances are measured distances along a route. In particular, the first distance may be between 40 and 50 meters, and the second distance between 2 and 7.5 meters. This offers the advantage that the distances can be calculated easily, without additional information on the instantaneous position of the motor vehicle and the specified position. This also allows the visual range of the driver to be easily taken into account. The distances specified here have proven to be particularly advantageous.

In an alternative embodiment to the embodiment described in the preceding paragraph, it is provided that the two distances are measured on the basis of time. To enable this measurement, the speed of the motor vehicle during determination of the distance of the specified position from the instantaneous position of the motor vehicle is taken into account. In particular, the first distance in this case may be between 4.8 seconds and 6 seconds, and the second distance may be between 0.2 seconds and 0.9 seconds. This offers the advantage of enabling the driver's reaction time to be taken into account as a critical measurement in selecting the distances. The specified amounts have proven advantageous in this case.

In a further advantageous embodiment it is provided that the two distances are adapted in each case to the current speed of the motor vehicle and/or to the longitudinal acceleration and/or lateral acceleration and/or to a steering angle and/or to other vehicle dynamics data and/or to weather conditions and/or to the state of the driver and/or to traffic-related reports transmitted by another motor vehicle and/or to traffic-related reports transmitted by an infrastructure. This offers the advantage of enabling the prevention of communication to be adapted in each case for each specified position to the present conditions of the environment and the vehicle, and to the state of the driver, that is to say, to the dynamic nature of traffic and of situations. This enables the greatest possible safety to be achieved while also ensuring the shortest possible prevention of communication, resulting in minimal impact on driver comfort.

The invention further relates to a motor vehicle which has a communication device, a navigation system coupled to the communication device, and an analysis unit. The analysis unit is designed to specify at least one position at which a demanding driving situation for the driver of the motor vehicle is expected, according to a predetermined definition. The analysis unit is further designed to determine the distance of the motor vehicle from the specified position, and to determine whether the motor vehicle is approaching and/or is moving away from the specified position. Finally, the analysis unit is designed to assess whether the ascertained distance is shorter than a first predetermined distance if the motor vehicle is approaching the specified position and/or whether the ascertained distance is shorter than a second predetermined distance if the motor vehicle is moving away from the specified position. The communication device is designed to prevent communication via the communication device if the ascertained distance of the motor vehicle from the specified position is shorter than the first or the second distance. Advantages and advantageous embodiments correspond to the advantages and advantageous embodiments of the method described.

All features and combinations of features mentioned above in the description and those mentioned below in the description of the figures and/or any features and combinations of features shown solely in the figures may be used not only in the combination indicated in each case but also in other combinations or alone, without going beyond the scope of the invention. Embodiments of the invention that are not explicitly shown in the figures and described but which proceed from separate combinations of features from the described embodiments and can be produced are therefore also considered to be included and disclosed.

One embodiment of the invention will be described in greater detail in the following, with reference to a schematic drawing. The sole drawing illustrates the functioning of one example of an embodiment of the method through a schematic representation of a specified position at which a demanding driving situation for the driver of the motor vehicle is expected.

The FIGURE illustrates the functioning of one embodiment example of the method. In the present case, a demanding driving situation for a driver of a motor vehicle is defined as a driving situation in which, for accident-free operation of the motor vehicle, a greater level of attention is required of the driver as compared with the average attention level required for operating the motor vehicle. The example shows the vehicle making a turn, in this case to the left, from a secondary road to a main road. In this case, the position at which the demanding driving situation for the driver is expected is the stop line of the road from which the driver is turning. The position information may be obtained, for example, from route data from a navigation system in motor vehicle V, which are analyzed by an analysis unit in motor vehicle V. The analysis unit then ascertains a distance d of motor vehicle V from the specified position P. At the same time, the analysis unit ascertains whether motor vehicle V is approaching or moving away from specified position P. In the example shown, motor vehicle V is at a first position x1 and is approaching specified position P, in this case the stop line. In this case, the analysis unit assesses whether the ascertained distance d of motor vehicle V from specified position P is shorter than a first predetermined distance D1. This distance may be 45 meters, for example. In the situation shown in the FIGURE, this is not the case for the first position x1. Accordingly, in this case, communication via the communication device is not prevented when motor vehicle V is at the first position x1. The driver can thus make calls and send and/or receive messages for example via a mobile phone coupled to the communications device via a data connection.

As motor vehicle V approaches specified position P, the ascertainment and assessment of the distance of motor vehicle V from specified position P, which can particularly proceed continuously, will provide the result at a second position x2 of motor vehicle V that distance d of motor vehicle V from specified position P is shorter than the first predetermined distance D1. As soon as this is ascertained, communication via the communication device is prevented. Thus in the present case, no new calls can be placed via the mobile phone coupled to the communication device, and existing calls may also be interrupted or placed on hold, with a message to this effect provided to the parties involved. When the second position x2 is reached, the composing of messages, for example E-mail or SMS messages, is paused. The receiving of such messages also is not displayed or is delayed, so that the driver will not be distracted by the notifications.

Finally, motor vehicle V reaches specified position P and then passes this position, in this case by turning motor vehicle V to the left. Motor vehicle V thus reaches a third position x3, which is behind specified position P from the standpoint of first position x1 and second position x2. Accordingly, the ascertainment of distance d of motor vehicle V reveals whether motor vehicle V is approaching or moving away from specified position P, and therefore, motor vehicle V is moving away from specified position P. The analysis unit then assesses whether the distance d ascertained at the third position x3 is shorter than a second predetermined distance D2. This distance may be 5 meters, for example. This is the case in the example shown, and therefore communication via the communication device is still prevented by the communication device at the third position x3. Depending on the amount chosen for the second distance D2 and the speed of motor vehicle V, the ascertainment of the distance or the assessment of the distance will sooner or later reveal, however, that the ascertained distance d of motor vehicle V from specified position P is greater than the second predetermined distance D2. When this is the case, the prevention of communication is terminated. This is the case, for example, at the fourth position x4. At that point, communication is no longer prevented, so that the driver can again utilize the functions of the mobile phone coupled to the communication device without restriction. It is also possible to only partially limit the functionality of the mobile phone within the first and second distances D1, D2, for example to prevent calls but allow messages to be received, or to allow or prevent any other combinations of different functions. It is also possible, in particular, for the communication device to put calls through to the driver only from a predefined group of callers, known as "favorites", within the distances in question.

In summary, it can therefore be stated that safety in operating motor vehicle V is increased by the prevention of communication within a predetermined route segment B, which extends around a specified position P. Outside of this route segment B, however, in other route segments A, the driver can communicate unimpeded via the communication device. Route segment B is subdivided according to the first and second distances D1, D2. In the present case, route segment B extends primarily within an area in front of specified position P, since the first distance D1 is greater than the second distance D2.

The invention claimed is:
1. A method for operating a motor vehicle which has a communication device, a navigation system coupled to the communication device, and an analysis unit, the method comprising:
 a) defining a demanding driving situation for a driver of the motor vehicle based on a position ($x_1$, $x_2$, $x_3$, $x_4$) of the motor vehicle;
 b) specifying, by means of the analysis unit, a position at which the demanding driving situation for the driver of the motor vehicle is expected;
 c) ascertaining, by means of the analysis unit, a distance of the motor vehicle from the specified position;
 d) assessing, by means of the analysis unit, whether the ascertained distance is shorter than a first predetermined distance based on the motor vehicle approaching the specified position and whether the ascertained dis- tance is shorter than a second predetermined distance based on the motor vehicle moving away from the specified position; and e) preventing, by means of the communication device, communication via the communication device in response to the ascertained distance being assessed at step (d) to be shorter than either the first predetermined distance or the second predetermined distance.

2. The method of claim 1, wherein the communication device comprises a hands-free device and is coupled, via a data transmission interface, to a mobile telephone that is not permanently installed in the motor vehicle.

3. The method of claim 1, wherein the communication via the communication device comprises at least one of the following activities: placing or receiving a telephone call and/or receiving an e-mail and/or sending an e-mail and/or receiving some other message and/or sending some other message.

4. The method of claim 1, wherein the demanding driving situation for the driver of the motor vehicle is defined as a driving situation in which, for accident-free operation of the motor vehicle, a greater level of attention is required of the driver of the motor vehicle as compared with an average attention level required for operating the motor vehicle.

5. The method of claim 1, wherein the specified position is an intersection, a merging roadway, a turn-off point or roadway exit, a construction zone, a location of at least one object in the roadway, a location of an accident, an area of traffic congestion, a location of a change in weather, or a position of another motor vehicle.

6. The method of claim 1, wherein the specified position is exclusively specified based on a map which is stored in the navigation system.

7. The method of claim 1, wherein the first predetermined distance is greater than the second predetermined distance.

8. The method of claim 1, wherein the first and second predetermined distances are measured distances along a route, and the first predetermined distance is between 40 meters and 50 meters and the second predetermined distance is between 2 meters and 7.5 meters.

9. The method of claim 1, wherein the first and second predetermined distances are distances measured in terms of time based on a speed of the motor vehicle, and the first predetermined distance is between 4.8 seconds and 6.0 seconds and the second predetermined distance is between 0.2 seconds and 0.9 seconds.

10. The method of claim 1, wherein the first and second predetermined distances are adapted to a current speed of the motor vehicle and/or to a longitudinal acceleration and/or to a lateral acceleration and/or to a steering angle and/or to other vehicle dynamics data and/or to weather conditions and/or to a state of the driver of the motor vehicle and/or to traffic-related reports transmitted from other motor vehicles and/or to traffic-related reports transmitted from an infrastructure.

11. The method of claim 1, wherein the second predetermined distance is between 5% and 15% of the first predetermined distance.

12. A motor vehicle comprising:
a communication device;
a navigation system coupled to the communication device; and
an analysis unit, wherein the analysis unit is configured to:

a) specify a position at which a demanding driving situation, according to a predetermined definition, for a driver of the motor vehicle is expected,
b) ascertain a distance of the motor vehicle from the specified position, and
c) assess whether the ascertained distance is shorter than a first predetermined distance based on the motor vehicle approaching the specified position and whether the ascertained distance is shorter than a second predetermined distance based on the motor vehicle moving away from the specified position,
wherein the communication device is configured to prevent communication via the communication device in response to the ascertained distance being assessed at step (c) to be shorter than either the first predetermined distance or the second predetermined distance.

13. The motor vehicle of claim 12, wherein the communication device comprises a hands-free device and is coupled, via a data transmission interface, to a mobile telephone that is not permanently installed in the motor vehicle.

14. The motor of claim 12, wherein the communication via the communication device comprises at least one of the following activities: placing or receiving a telephone call and/or receiving an e-mail and/or sending an e-mail and/or receiving some other message and/or sending some other message.

15. The motor vehicle of claim 12, wherein the specified position is an intersection, a merging roadway, a turn-off point or roadway exit, a construction zone, a location of at least one object in the roadway, a location of an accident, an area of traffic congestion, a location of a change in weather, or a position of another motor vehicle.

16. The motor vehicle of claim 12, wherein the specified position is exclusively specified based on a map which is stored in the navigation system.

17. The motor vehicle of claim 12, wherein the first predetermined distance is greater than the second predetermined distance.

18. The motor vehicle of claim 12, wherein the first and second predetermined distances are measured distances along a route, and the first predetermined distance is between 40 meters and 50 meters and the second predetermined distance is between 2 meters and 7.5 meters.

19. The motor vehicle of claim 12, wherein the first and second predetermined distances are distances measured in terms of time based on the speed of the motor vehicle, and the first predetermined distance is between 4.8 seconds and 6.0 seconds and the second predetermined distance is between 0.2 seconds and 0.9 seconds.

20. The motor vehicle of claim 12, wherein the first and second predetermined distances are adapted to a current speed of the motor vehicle and/or to a longitudinal acceleration and/or to a lateral acceleration and/or to a steering angle and/or to other vehicle dynamics data and/or to weather conditions and/or to a state of the driver of the motor vehicle and/or to traffic-related reports transmitted from other motor vehicles and/or to traffic-related reports transmitted from an infrastructure.

* * * * *